(12) United States Patent
Sato

(10) Patent No.: US 7,243,304 B2
(45) Date of Patent: Jul. 10, 2007

(54) APPARATUS AND METHOD FOR CREATING A MAP OF A REAL NAME WORD TO AN ANONYMOUS WORD FOR AN ELECTRONIC DOCUMENT

(75) Inventor: Makoto Sato, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 739 days.

(21) Appl. No.: 10/183,873

(22) Filed: Jun. 28, 2002

(65) Prior Publication Data

US 2003/0005312 A1 Jan. 2, 2003

(30) Foreign Application Priority Data

Jun. 29, 2001 (JP) .......................... P2001-198325

(51) Int. Cl.
*G06N 3/00* (2006.01)
(52) U.S. Cl. ...................................... 715/532; 715/531
(58) Field of Classification Search ........ 715/530–532, 715/513; 709/206; 707/3, 103 R; 713/165–168; 704/260; 380/282
See application file for complete search history.

(56) References Cited

U.S. PATENT DOCUMENTS

| | | | | |
|---|---|---|---|---|
| 5,907,677 | A * | 5/1999 | Glenn et al. ................ 709/206 |
| 6,061,448 | A * | 5/2000 | Smith et al. ................ 380/282 |
| 6,226,745 | B1 * | 5/2001 | Wiederhold .................... 726/1 |
| 6,449,718 | B1 * | 9/2002 | Rucklidge et al. .......... 713/168 |
| 6,631,482 | B1 * | 10/2003 | Marks ......................... 714/45 |
| 6,643,686 | B1 * | 11/2003 | Hall ........................... 709/206 |
| 6,674,859 | B1 * | 1/2004 | Wittkotter .................... 380/243 |
| 6,785,812 | B1 * | 8/2004 | Botham et al. ............. 713/168 |
| 6,981,217 | B1 * | 12/2005 | Knauft et al. ............... 715/531 |
| 7,007,025 | B1 * | 2/2006 | Nason et al. .................. 707/9 |
| 2003/0028801 | A1 * | 2/2003 | Liberman et al. ........... 713/200 |
| 2003/0177378 | A1 * | 9/2003 | Wittkotter ................... 713/193 |
| 2005/0002053 | A1 * | 1/2005 | Meador et al. ............ 358/1.14 |
| 2005/0060643 | A1 * | 3/2005 | Glass et al. .............. 715/501.1 |
| 2005/0147252 | A1 * | 7/2005 | Dasari et al. ............... 380/277 |
| 2006/0005017 | A1 * | 1/2006 | Black et al. ................ 713/165 |

FOREIGN PATENT DOCUMENTS

JP 2000-112796 4/2000

* cited by examiner

*Primary Examiner*—Stephen Hong
*Assistant Examiner*—Manglesh Patel
(74) *Attorney, Agent, or Firm*—Finnegan, Henderson, Farabow, Garrett & Dunner, L.L.P.

(57) ABSTRACT

An anonymous level decision unit decides an anonymous level to anonymize a real name word included in the electronic document. An additional label generation unit generates an additional label corresponding to the real name word based on an identifier. A dictionary stores a correspondence relationship between the real name word and an anonymous term as an abstract concept of the real name word. A map creation unit selects the anonymous term corresponding to the real name word based on the anonymous level from the dictionary, generates an anonymous word corresponding to the real name word by adding the additional label to the anonymous term, and correspondingly stores the real name word and the anonymous word. A map representing a correspondence relationship between the real name word and the anonymous word for the identifier is created.

19 Claims, 13 Drawing Sheets

<ANONYMOUS LEVEL DATA>

Tynabook : LEVEL 4

NOTEBOOK PERSONAL COMPUTER : LEVEL 1

AKIHABARA BRANCH : LEVEL 2

NUMBER OF UNITS : LEVEL 1

FIG.2

<REAL NAME WORD/ANONYMOUS TERM DICTIONARY>

| REAL NAME WORD | ANONYMOUS TERM | | | |
| --- | --- | --- | --- | --- |
| | ANONYMOUS LEVEL1 | ANONYMOUS LEVEL2 | ANONYMOUS LEVEL3 | ANONYMOUS LEVEL4 |
| Tynabook | NOTE PC | PC | ELECTRONIC EQUIPMENT | BRAND |
| Waio | NOTE PC | PC | ELECTRONIC EQUIPMENT | BRAND |
| Think Qad | NOTE PC | PC | ELECTRONIC EQUIPMENT | BRAND |
| NOTEBOOK PERSONAL COMPUTER | PRODUCT CATEGORY | — | — | — |
| AKIHABARA BRANCH | LARGE BRANCH | BRANCH | — | — |
| IKEBUKURO BRANCH | LARGE BRANCH | BRANCH | — | — |
| KAWASAKI BRANCH | LARGE BRANCH | BRANCH | — | — |
| SHINJYUKU BRANCH | MEDIUM BRANCH | BRANCH | — | — |
| YOKOHAMA BRANCH | MEDIUM BRANCH | BRANCH | — | — |
| (X) WEIGHT | (NUMERICAL VALUE) | — | — | — |
| (Y) NUMBER OF UNITS | (NUMERICAL VALUE) | — | — | — |

FIG.3

<REAL NAME WORD/ANONYMOUS WORD MAP (DOCUMENT PROCESSING PERSON ID:XXX>

| REAL NAME WORD | ANONYMOUS TERM | ADDITIONAL LABEL | ANONYMOUS WORD |
|---|---|---|---|
| Tynabook | BRAND | A | BRAND A |
| Waio | BRAND | B | BRAND B |
| Think Qad | BRAND | C | BRAND C |
| NOTE PERSONAL COMPUTER | PRODUCT CATEGORY | A | PRODUCT CATEGORY A |
| AKIHABARA BRANCH | BRANCH | A | BRANCH A |
| IKEBUKURO BRANCH | BRANCH | B | BRANCH B |
| KAWASAKI BRANCH | BRANCH | C | BRANCH C |
| SHINJYUKU BRANCH | BRANCH | D | BRANCH D |
| YOKOHAMA BRANCH | BRANCH | E | BRANCH E |
| (Y) NUMBER OF UNITS | 1/100 | UNIT | (Y/100) UNIT |

FIG.4

APPARATUS AND METHOD FOR CREATING A MAP OF A REAL NAME WORD TO AN ANONYMOUS WORD FOR AN ELECTRONIC DOCUMENT

CROSS-REFERENCE TO RELATED APPLICATIONS

This application is based upon and claims the benefit of priority from the prior Japanese Patent Application PH2001-198325, filed on Jun. 29, 2001, the entire contents of which are incorporated herein by reference.

FIELD OF THE INVENTION

The present invention relates to apparatus and method for creating a map of a real name word to an anonymous word for an electric document useful when requesting others to analyze an anonymous version of the document and receiving an analysis result of the document from the others.

BACKGROUND OF THE INVENTION

By developing information communication, such as the Internet, it becomes easy for a plurality of persons each belonging to different organizations to do business in cooperation with each other. For example, assume that a company A possesses customer data and a company B possesses know-how of data analysis. In this case, company A often requests company B to analyze the customer data by supplying the customer data in a database through the Internet. Company A receives an analysis report of the customer data from company B, and sends an indication of the analysis again to company B using E-mail. Briefly, by giving and taking of various kinds of electronic documents through the Internet, business can be easily executed among a plurality of companies (organizations).

In transfer (giving and taking) of electronic documents among different companies, management of important information such as customer data or company secret data in the electronic document is a question. In the above example of the database supplied from the company A to the company B, secret data not to become known by the company B is often included. In the prior art, secret data is deleted by a user himself or by a computer program, or ciphered as meaningless data for person. However, if deleted (or ciphered) data includes information necessary for analysis, the information cannot be utilized for analysis. Furthermore, if the secret data is ciphered as a character-string that prevents a person from understanding, a hindrance often occurs in the business between the company A and the company B.

In data communication through the Internet, a prior method for hiding secret data for a sender, Japanese Patent Disclosure (Kokai) PH2000-324094 is known. In this method, personal information such as a name is hidden in the sending information. However, other kinds of secret data (all contents) in the electronic document cannot be hidden. Furthermore, the hidden part (anonymous part) in the electronic document cannot be returned to a real name.

As mentioned-above, when the electronic document including important information of the user's own company is transferred and analyzed by another company, the other company is in need of information about the important information. However, in the prior method in which secret data is deleted or ciphered, it is a problem that a document processing person (analyst) in another company cannot understand the electronic document sufficiently for analysis.

SUMMARY OF THE INVENTION

It is an object of the present invention to provide apparatus and method for creating a map of a real name word to an anonymous word, which is useful for anonymously protecting detail content of an electronic document while summary of the electronic document is understandable for a person.

According to the present invention, there is provided an apparatus for creating a map of a real name word to an anonymous word for an electronic document, comprising an anonymous level decision unit configured to decide an anonymous level to anonymize at least one real name word included in the electronic document; an additional label generation unit configured to generate an additional label corresponding to each real name word based on an identifier of a processing person of the electronic document; a dictionary configured to store a correspondence relationship between each real name word and an anonymous term as an abstract concept of the real name word; and a map creation unit configured to select the anonymous term corresponding to each real name word based on the anonymous level from the dictionary, to generate an anonymous word corresponding to each real name word by adding the additional label to the anonymous term, and to correspondingly store the real name word and the anonymous word, whereby a map representing a correspondence relationship between each real name word and the anonymous word for the identifier is created.

Further in accordance with the present invention, there is also provided a method for creating a map of a real name word to an anonymous word for an electronic document. The method begins by deciding an anonymous level to anonymize at least one real name word included in the electronic document; generating an additional label corresponding to each real name word based on an identifier; storing a correspondence relationship between each real name word and an anonymous term as an abstract concept of the real name word in a dictionary; selecting the anonymous term corresponding to each real name word based on the anonymous level from the dictionary; generating an anonymous word corresponding to each real name word by adding the additional label to the anonymous term; and correspondingly storing the real name word and the anonymous word, whereby a map representing a correspondence relationship between each real name word and the anonymous word for the identifier is created.

Further in accordance with the present invention, there is also provided a computer program product, comprising: a computer readable program code embodied in said product for causing a computer to create a map of a real name word to an anonymous word for an electronic document. The computer readable program code having: a first program code to decide an anonymous level to anonymize at least one real name word included in the electronic document; a second program code to generate an additional label corresponding to each real name word based on an identifier; a third program code to store a correspondence relationship between each one real name word and an anonymous term as an abstract concept of the real name word in a dictionary; a fourth program code to select the anonymous term corresponding to each real name word based on the anonymous level from the dictionary; a fifth program code to generate an anonymous word corresponding to each real name word by adding the additional label to the anonymous term; and a sixth program code to correspondingly store the real name word and the anonymous word, whereby a map representing a correspondence relationship between each real name word and the anonymous word for the identifier is created.

Further in accordance with the present invention, there is also provided an apparatus for anonimizing an electronic document, comprising: an anonymous level decision unit unfigured to decide an anonymous level to anonymize at least one real name word included in the electronic document; an additional label generation unit configured to generate an additional label corresponding to each real name word based on an identifier; a dictionary configured to store a correspondence relationship between each real name word and an anonymous term as abstract concept of the real name word; a map creation unit configured to select the anonymous term corresponding to each real name word based on the anonymous level from the dictionary, to generate an anonymous word corresponding to each real name word by adding the additional label to the anonymous term, and to correspondingly store the real name word and the anonymous word, whereby a map representing a correspondence relationship between each real name word and the anonymous word for the identifier is created; a real name word extraction unit configured to extract each real name word from the electronic document by referring to the map; and a conversion unit configured to replace the extracted real name word with corresponding anonymous word by referring to the map.

Further in accordance with the present invention, there is also provided a method for anonimizing an electronic document, comprising: deciding an anonymous level to anonymize at least one real name word included in the electronic document; generating an additional label corresponding to each real name word based on an identifier; storing a correspondence relationship between each real name word and an anonymous term as an abstract concept of the real name word in a dictionary; selecting the anonymous term corresponding to each real name word based on the anonymous level from the dictionary; generating an anonymous word corresponding to each real name word by adding the additional label to the anonymous term; correspondingly storing the real name word and the anonymous word, whereby a map representing a correspondence relationship between each real name word and the anonymous word for the identifier is created; extracting each real name word from the electronic document by referring to the map; and replacing the extracted real name word with corresponding anonymous word by referring to the map.

Further in accordance with the present invention, there is also provided a computer program product, comprising: a computer readable program code embodied in said product for causing a computer to anonimize an electronic document, said computer readable program code having: a first program code to decide an anonymous level to anonymize at least one real name word included in the electronic document; a second program code to generate an additional label corresponding to each real name word based on an identifier; a third program code to store a correspondence relationship between each real name word and an anonymous term as abstract concept of the real name word in a dictionary; a fourth program code to select the anonymous term corresponding to each real name word based on the anonymous level from the dictionary; a fifth program code to generate an anonymous word corresponding to each real name word by adding the additional label to the anonymous term; a sixth program code to correspondingly store the real name word and the anonymous word, whereby a map representing a correspondence relationship between each real name word and the anonymous word for the identifier is created; a seventh program code to extract each real name word from the electronic document by referring to the map; and an eighth program code to replace the extracted real name word with corresponding anonymous word by referring to the map.

Further in accordance with the present invention, there is also provided a apparatus for unanonimizing an electronic document, comprising: an anonymous level decision unit configured to decide an anonymous level to anonymize at least one real name word included in the electronic document; an additional label generation unit configured to generate an additional label corresponding to each real name word based on an identifier; a dictionary configured to store a correspondence relationship between each real name word and an anonymous term as an abstract concept of the real name word; a map creation unit configured to select the anonymous term corresponding to each real name word based on the anonymous level from said dictionary, to generate an anonymous word corresponding to each real name word by adding the additional label to the anonymous term, and to correspondingly store the real name word and the anonymous word, whereby a map representing a correspondence relationship between each real name word and the anonymous word for the identifier is created; an anonymous word extraction unit configured to extract each anonymous word from an anonymous document related to an anonymous version of the electronic document by referring to the map; and a conversion unit configured to add corresponding real name word to the extracted anonymous word in the anonymous document by referring to the map.

Further in accordance with the present invention, there is also provided a method for unanonimizing an electronic document, comprising: deciding an anonymous level to anonymize at least one real name word included in the electronic document; generating an additional label corresponding to each real name word based on an identifier; storing a correspondence relationship between each real name word and an anonymous term as an abstract concept of the real name word in a dictionary; selecting the anonymous term corresponding to each real name word based on the anonymous level from the dictionary; generating an anonymous word corresponding to each real name word by adding the additional label to the anonymous term; correspondingly storing the real name word and the anonymous word, whereby a map representing a correspondence relationship between each real mane word and the anonymous word for the identifier is created; extracting each anonymous word from an anonymous document related to an anonymous version of the electronic document by referring to the map; and adding corresponding real name word to the extracted anonymous word in the anonymous document by referring to the map.

Further in accordance with the present invention, there is also provided a computer program product, comprising: a computer readable program code embodied in said product for causing a computer to unanonimize an electronic document, said computer readable program code having: a first program code to decide an anonymous level to anonymize at least one real name word included in the electronic document; a second program code to generate an additional label corresponding to each real name word based on an identifier; a third program code to store a correspondence relationship between each real name word and an anonymous term as an abstract concept of the real name word in a dictionary; a fourth program code to select the anonymous term corresponding to each real name word based on the anonymous level from the dictionary; a fifth program code to generate an anonymous word corresponding to each real name word by adding the additional label to the anonymous term; a sixth program code to correspondingly store the real name word and the anonymous word, whereby a map representing a correspondence relationship between each real name word and the anonymous word for the identifier is created; a seventh program code to extract each anonymous word from an anonymous document related to an anonymous version of the electronic document by referring to the map; and an eighth program code to add corresponding real name word to the extracted anonymous word in the anonymous document by referring to the map.

BRIEF DESCRIPTION OF THE DRAWINGS

FIG. 2 is an example of anonymous level data.

FIG. 3 is an example of a dictionary of real name word/anonymous term.

FIG. 4 is an example of the map of real name word/anonymous word.

DETAILED DESCRIPTION OF THE EMBODIMENT

Figure 1:
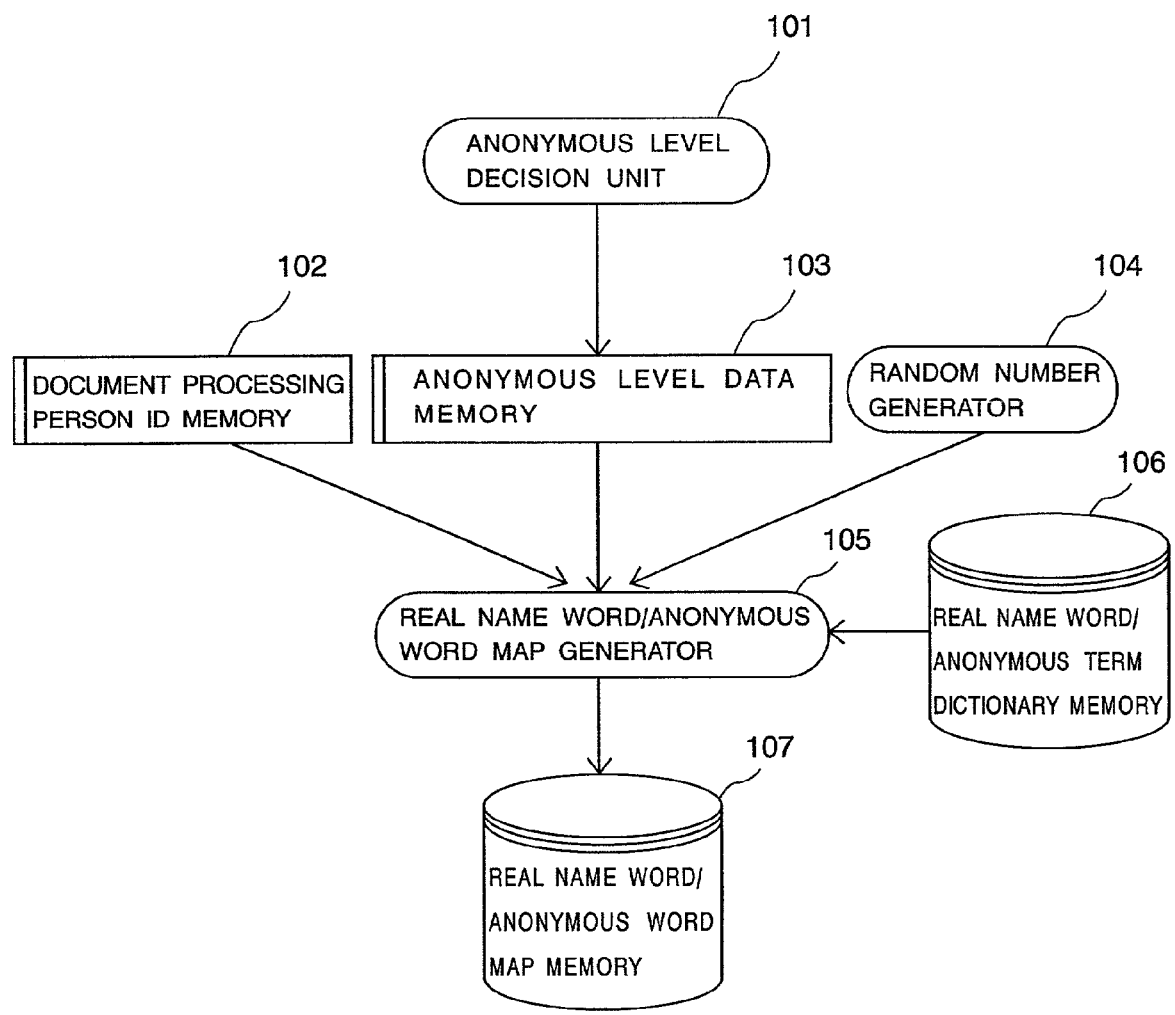
FIG. 1 is a block diagram of an apparatus for creating a map of real name word/anonymous word (a real name word to an anonymous word) for an electronic document according to a first embodiment of the present invention.

Various embodiments of the present invention will be explained by referring to the drawings.

In general, the word "anonymize" means to convert to a more general form. Likewise, the term "unanonymize" means to convert back from a less specific and more general form to a more specific and less general form. The conversion of a document to and from a less specific or anonymous version of the document allows third party manipulation and analysis of the document while keeping the document's details secret. Embodiments of the present invention achieve this with real name words, anonymous terms, and anonymous words. In embodiments of the present invention, a predetermined noun and a term representing a predetermined unit are respectively defined as a real name word. As examples of the real name word, a proper noun such as Tokyo Tower and a unit such as Mbyte (Mega byte) are selected. Next, the real name word is vaguely represented by an abstract concept. In the case of a unit as the real name word, a numerical value accompanied with a predetermined unit is converted as vague numerical value having no difficulty in analyzing for analyst (For example, proportion relationship among a plurality of numerical values is preserved). In this case, information used for conversion (anonymization) of the real name word is called an anonymous term. For example, the anonymous term corresponding to Tokyo Tower is a landmark building or a building. A plurality of anonymous terms corresponding to the same real name word can be prepared according to abstract degrees. Furthermore, the anonymous term corresponding to Mbyte can be a random magnification such as $1/1000$ times or 12 times to mask the specific amount of the real term.

Next, an anonymous word is defined as follows. If the real name word is a predetermined noun, an additional label uniquely representing each predetermined noun is added to the anonymous term corresponding to the predetermined noun. For example, an additional label may be "A, B, C, . . . " or "1, 2, 3 . . . ". Briefly, the anonymous term with the additional label is called the anonymous word. If the real name word is associated with a predetermined unit, the anonymous term (magnification) corresponding to the predetermined unit is multiplied with a numerical value accompanied with the predetermined unit, and an addition label uniquely representing each predetermined unit is added to the multiplication result as the anonymous word. For example, a landmark building A, a building B, or 10 unit, are generated as the anonymous term. If a plurality of units (For example, number of units, weight, length, and so on) are included in the electronic document, a unit 1 is assigned to the number of units and a unit 2 is assigned to the weight.

In embodiments of the present invention, a consistent relationship between the real name word in the electronic document and the anonymous word is preserved as a map (such as a correspondence table) corresponding to a document processing person such as each analyst. By changing the map in correspondence with each document processing person, the electronic document is converted (anonymized) into an understandable representation of the document for a person. In this case, a person who has a right to know the real name word is called a user, and a person who does not have a right to know the real name word is called a document processing person. A company or an organization which has a right to know the real name word is also a user for the purposes of this invention. A company or an organization which does not have a right to know the real name word is also a document processing person for the purposes of this invention. Furthermore, a document including the real name word is called a real name document, and a document not including the real name word is called an anonymous document.

FIG. 1 is a block diagram of the apparatus for creating a map of real name word/anonymous word in an electronic document according to the first embodiment of the present invention. As shown in FIG. 1, this apparatus is typically implemented in a computer (not shown) and includes an anonymous level decision unit 101, a document processing person ID (identification number) memory 102, an anonymous level data memory 103, a random number generator 104, a real name word/anonymous word map generator 105, a real name word/anonymous term dictionary memory 106, and a real name word/anonymous word map memory 107.

In the anonymous level decision unit 101, the anonymous level representing an abstract degree to convert is determined for each real name word in the electronic document. Anonymous level data consisting of these anonymous levels are stored in the anonymous level data memory 103. As a method for determining the anonymous level, for example, the anonymous level predetermined for each real name word may be selected, a user corrects the predetermined anonymous level using a GUI (Graphical User Interface) by referring to the real name word/anonymous term dictionary memory 106, or the anonymous level of the real name word is set by analyzing the document for usage of the real name word. Typically, the anonymous level is set low if the usage frequency is high.

FIG. 2 shows an example of the anonymous level data in case that the user suitably sets the anonymous level by referring to the real name word/anonymous term dictionary memory 106 according to an embodiment of the present invention. As shown in FIG. 2, the anonymous level is determined for each real name word. In general, the abstract degree of the real name word becomes high in proportion to degree which the user does not wish that the analyst (the document processing person) would know the real name word. Accordingly, in this case, the anonymous level of the real name word is high. For example, if the user does not absolutely wish that the analyst would know what the commodity name "Tynabook" is, the anonymous level is set as the highest level 4 as shown in FIG. 2.

As mentioned-above, if the anonymous level is determined for each real name word by the user's direct indication, the map 107 of real name word/anonymous word (explained hereinafter) on which the user's intention is affected is created. Furthermore, by referring to the sample electronic document, the anonymous level of the real name word can be determined so that the abstract degree of the real name word frequently used in the sample document becomes relatively low. This may be done because a frequently used real name word can be important for a subject of the document. In this case, the suitable map 107 (explained hereinafter) can be automatically created without the user's burden.

In the document processing person ID memory 102, a document processing person ID is stored and used to discriminate each person (analyst) who processes the anonymous document.

In the real name word/anonymous term dictionary memory 106, the anonymous term representing the abstract concept corresponding to each anonymous level is stored in correspondence with each real name word. In the real name word/anonymous term dictionary memory 106, the narrower the category of the real name word, the larger the number of the abstract concepts (anonymous terms) because the real name word of a narrow category is typically important information. On the other hand, if category of the real name word (such as a common noun) is wide, the number of the abstract concept (anonymous term) may be few. Because the real name word of wide category is originally abstract, the importance of the information is typically not so high.

In general, a "dictionary" can be any type of lookup or accessible memory used to store information. FIG. 3 shows an example of contents of the real name word/anonymous term dictionary in an embodiment of the present invention. In FIG. 3, the narrower the category of the real name word, the larger the number of the anonymous level. For example, in case of a common noun of wide category such as "notebook personal computer", one anonymous level is only prepared. On the other hand, in case of a commodity name of narrow category such as "Tynabook", four anonymous levels are prepared. Furthermore, in case that the real name word represents a unit (Such as, weight, number of units, and so on), a normalization numerical value, such as magnification, is prepared.

In the real name word/anonymous word map generator 105, the document processing person ID of the analyst is read from the document processing person ID memory 102, and the anonymous level data of each real name word is read from the anonymous level data memory 103. Then, by using a random number generated from the random number generator 104, an additional label preserving uniqueness between the real name word and the anonymous term is generated. Then, the anonymous word is created by adding the additional label to the anonymous term stored in the real name word/anonymous term dictionary memory 106. In this way, the real name word/anonymous word map representing a relationship (e.g., one-to-one) between each real name word and corresponding anonymous word is created and stored in the real name word/anonymous word map dictionary 107.

If a plurality of document processing persons exists or if the number of additional labels is large, generation of the additional label using the random number may be more effective in comparison with determination by the user's operation. However, if the number of additional labels is few, the additional label may be determined by the user's operation.

In an embodiment of the invention, FIG. 4 shows an example of the real name word/anonymous word map in case of using the anonymous level data shown in FIG. 2 and the real name word/anonymous term dictionary shown in FIG. 3. By referring to correspondence relationship stored in the real name word/anonymous word map 107, anonimization and unanonimization of the electronic document is executed. In this case, the anonymous term of each real name word "Tynabook", "Waio" and "Think Qad" are respectively "BRAND". If the anonymous term is used as the anonymous word as itself, a one-to-one relationship between the real name word and the anonymous word cannot be preserved. Accordingly, a plurality of random numbers of which the number of random numbers is equal to the number of the same anonymous terms is generated, and the additional label corresponding to each random number is added to each anonymous term. For example, as shown in FIG. 4, the additional label corresponding to each random number "1, 2, 3" is respectively "A, B, C". As a result, for example, the anonymous word corresponding to the real name word "Tynabook" is "BRAND A". Briefly, a one-to-one relationship between each real name word and corresponding anonymous word can be preserved.

Furthermore, if the real name word represents a unit with a numerical value, the normalization value (magnification) generated by the random number is stored as the anonymous term. For example, in FIG. 4, the anonymous term corresponding to a real name word "(Y) number of units" is "$1^1/_{100}$". In this case, the additional label is predetermined as a generic term such as "UNIT". This magnification is multiplied with the numerical value "(Y)" included in the real name word, and the additional label is added to the multiplication result as the anonymous word. For example, as shown in FIG. 4, in case of the real name word "(Y) number of units", the anonymous word is "(Y/100) unit".

As mentioned-above, the random number is used in case of creating the real name word/anonymous word map. As a result, when a user respectively requests two document processing persons A and B to analyze the same real name document, the user can respectively provide the document differently anonymized to the two document processing persons, A and B. Accordingly, if the document is unwillingly issued, the user can estimate the document processing person who has provided the document.

Figure 5:
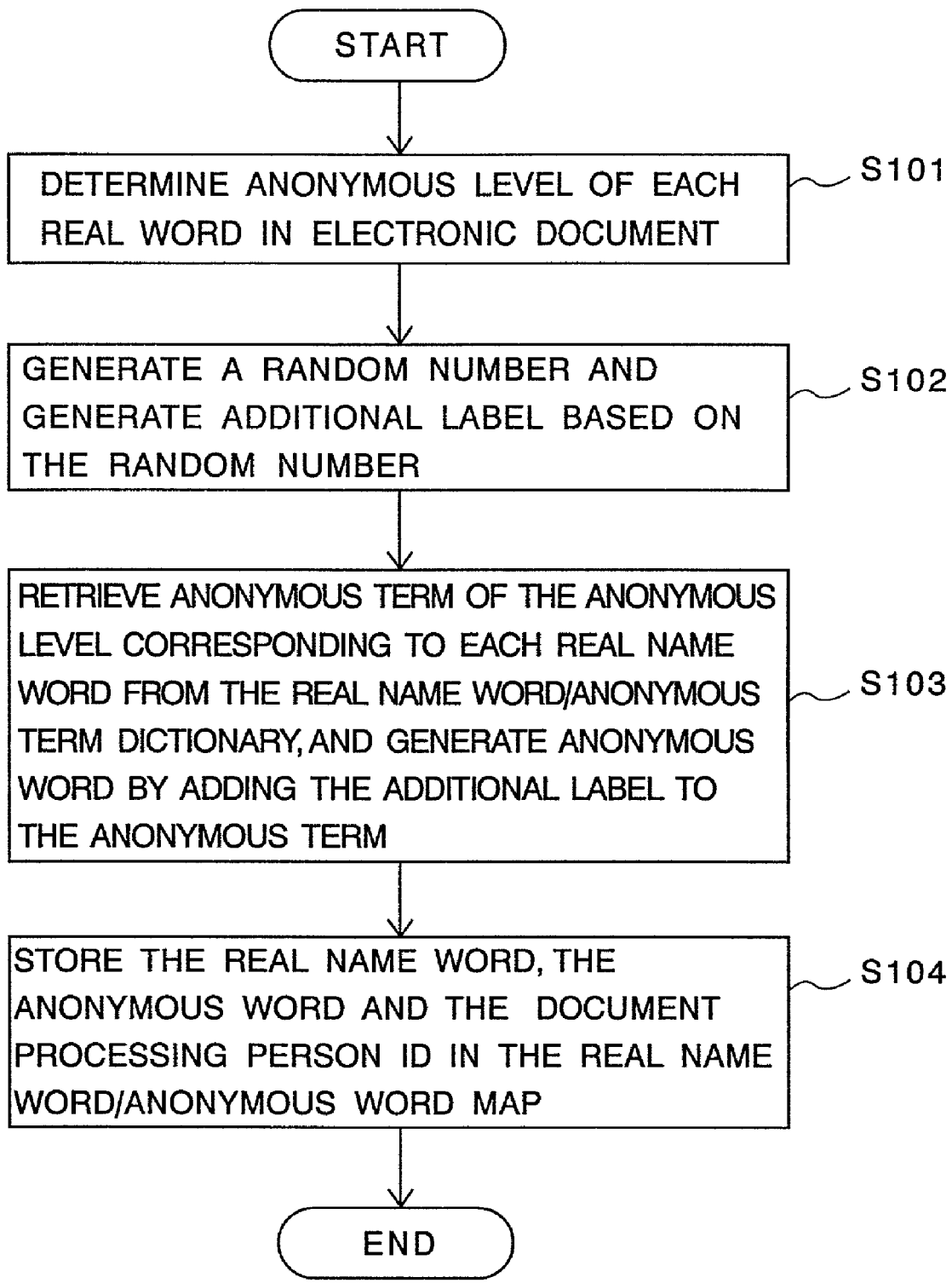
FIG. 5 is a flow chart of method for creating the map of real name word/anonymous word according to the first embodiment of the present invention.

FIG. 5 is a flow chart of a method for creating the map of real name word/anonymous word of an electronic document according to the first embodiment of the present invention. First, in the anonymous level decision unit 101, the anonymous level of each real name word in the electronic document is determined and stored in the anonymous level data memory 103 (S101). Next, in the real name word/anonymous word map generation unit 105, the document processing person ID of the analyst is read from the document processing person ID memory 102. By using a random number generated from the random number generator 104, the additional label of each real name word is created in correspondence with the document processing person ID (S102). Furthermore, as for each real name word of which the anonymous level is already determined in the anonymous level data memory 103, the anonymous term corresponding to the anonymous level is retrieved from the real name word/anonymous term dictionary memory 106. Then, by adding the additional label to the anonymous term, the anonymous word is generated (S103). Last, the real name word/anonymous word map representing one-to-one relationship between each real name word and corresponding anonymous word is stored in the real name word/anonymous word map memory 107 (S104).

Figure 6:
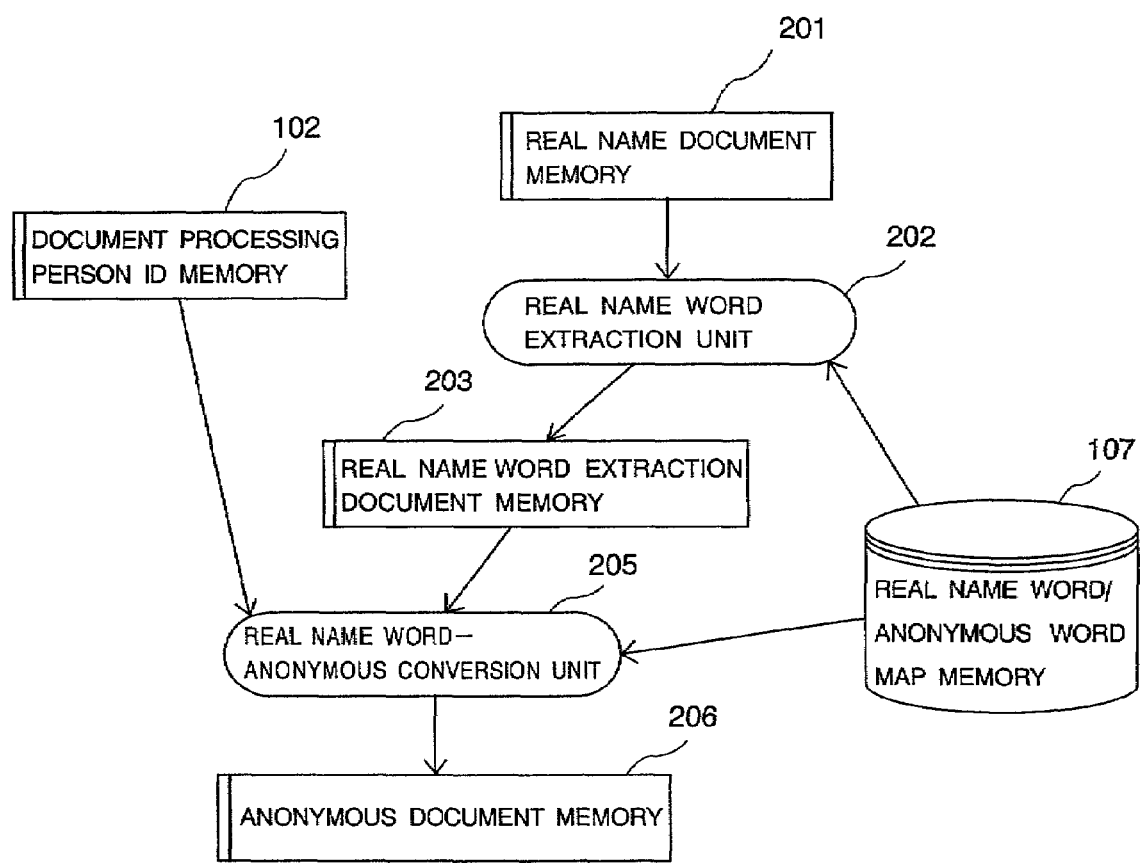
FIG. 6 is a block diagram of an apparatus for anonymizing an electronic document according to a second embodiment of the present invention.
Figure 7:
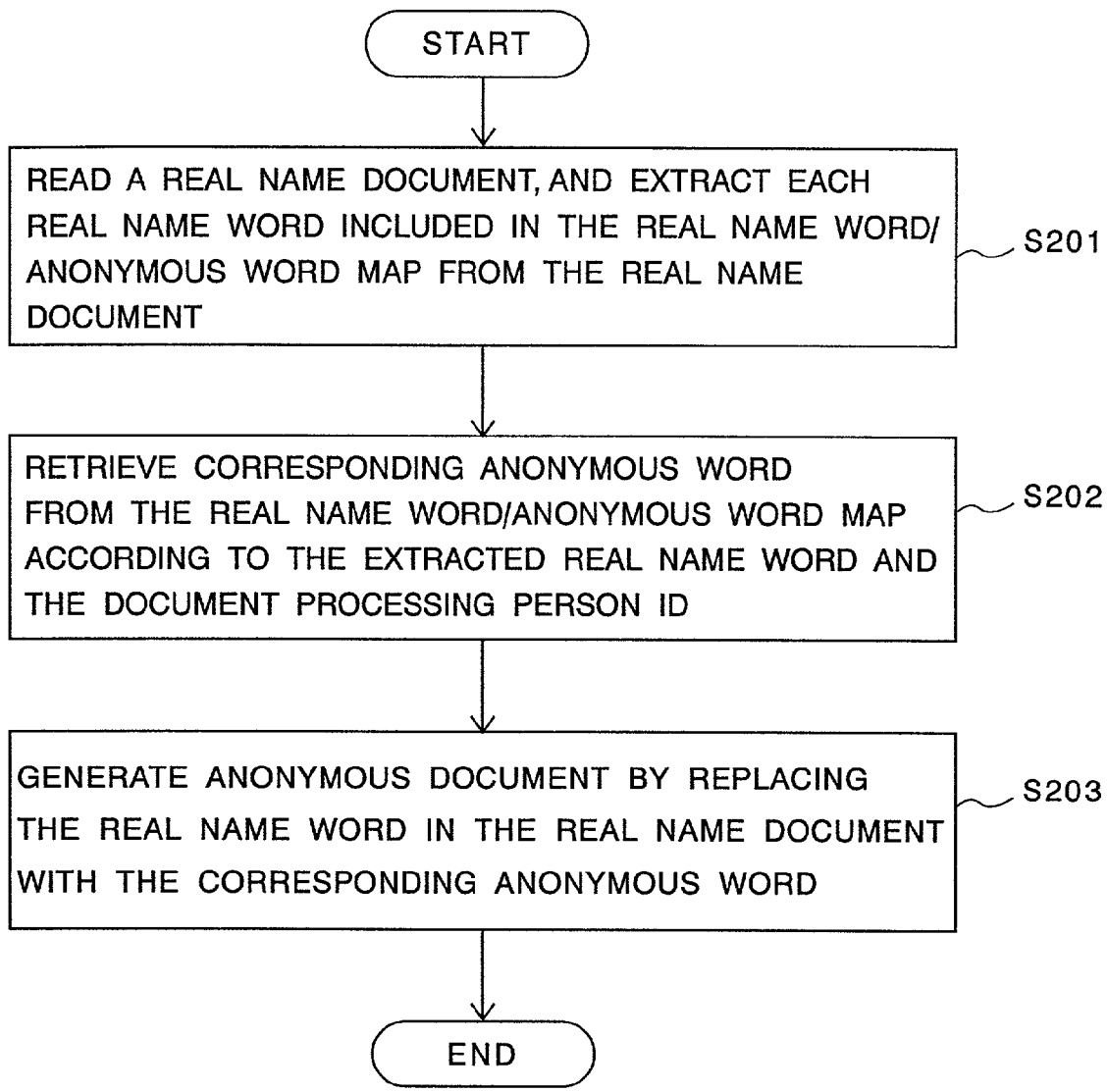
FIG. 7 is a flow chart of a method for anonymizing the electronic document according to the second embodiment of the present invention.

FIG. 6 is a block diagram of the apparatus for anonymizing an electronic document according to the second embodiment of the present invention. FIG. 7 is a flow chart of processing of a method for anonymizing an electronic document in an embodiment of the present invention. As shown in FIG. 6, this apparatus is implemented in a computer and includes a real name document memory 201, a real name word extraction unit 202, a real name word extraction document memory 203, the document processing person ID memory 102, a real name word-anonymous conversion unit 205, the real name word/anonymous word map memory 107, and an anonymous document memory 206.

In the real name document memory 201, a real name document as the electronic document of which contents are to be abstracted is stored.

Figure 8:
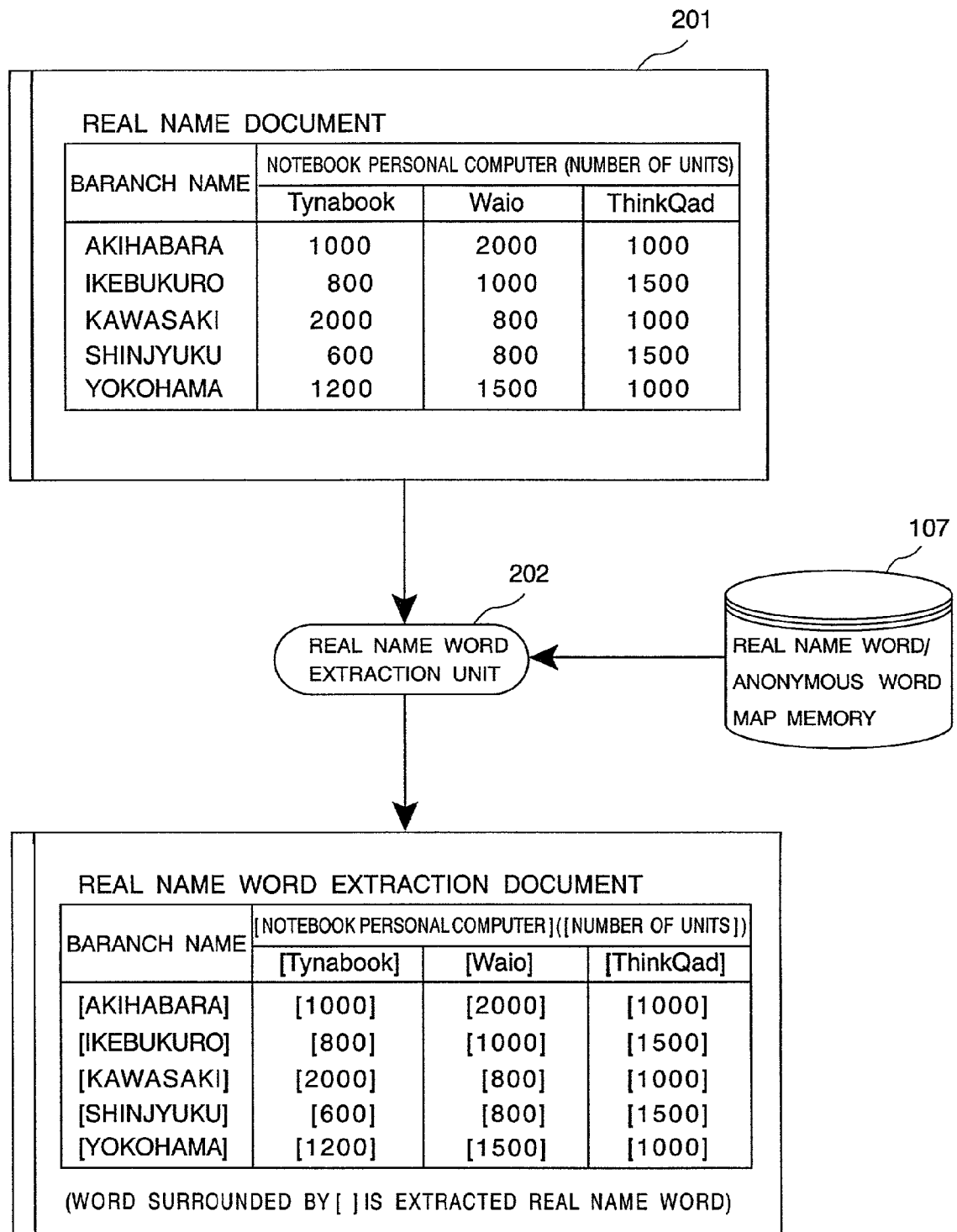
FIG. 8 is a schematic diagram of an extraction of the real name word from the electronic document according to an embodiment of the present invention.

In the real name word extraction unit 202, the real name document is read from the real name document memory 201 and the real name word/anonymous word map is read from the real name word/anonymous word map memory 107. Then, each real name word registered in the real name word/anonymous word map is extracted from the real name document. A real name word extraction document from which each real name word is extracted (discriminated) is stored in the real name word extraction document memory 203 (S201). FIG. 8 shows an example of the electronic document from which the real name word is extracted. As shown in FIG. 8, the real name word is extracted from the real name document of table format data, and the extracted real name word is discriminated by "[ ]" in the real name document.

In the document processing person ID memory 102, identification number of a person (analyst) to process a document anonimized from the real name document is stored.

In the real name word-anonymous conversion unit 205, a real name word extraction document is read from the real name word extraction document memory 203, and a document processing person ID of the analyst is read from the document processing person ID memory 102. Then, a real name word/anonymous word map corresponding to the document processing person ID is selected from the real name word/anonymous word map memory 107. The anonymous word corresponding to each real name word in the real name word extraction document is decided by referring to the real name word/anonymous word map (S202). Furthermore, each real name word discriminated in the real name word extraction document is converted to a decided anonymous word. In this way, an anonymous document in which each real name word is replaced by the anonymous word is created and stored in the anonymous document memory 206 (S203).

Figure 9:
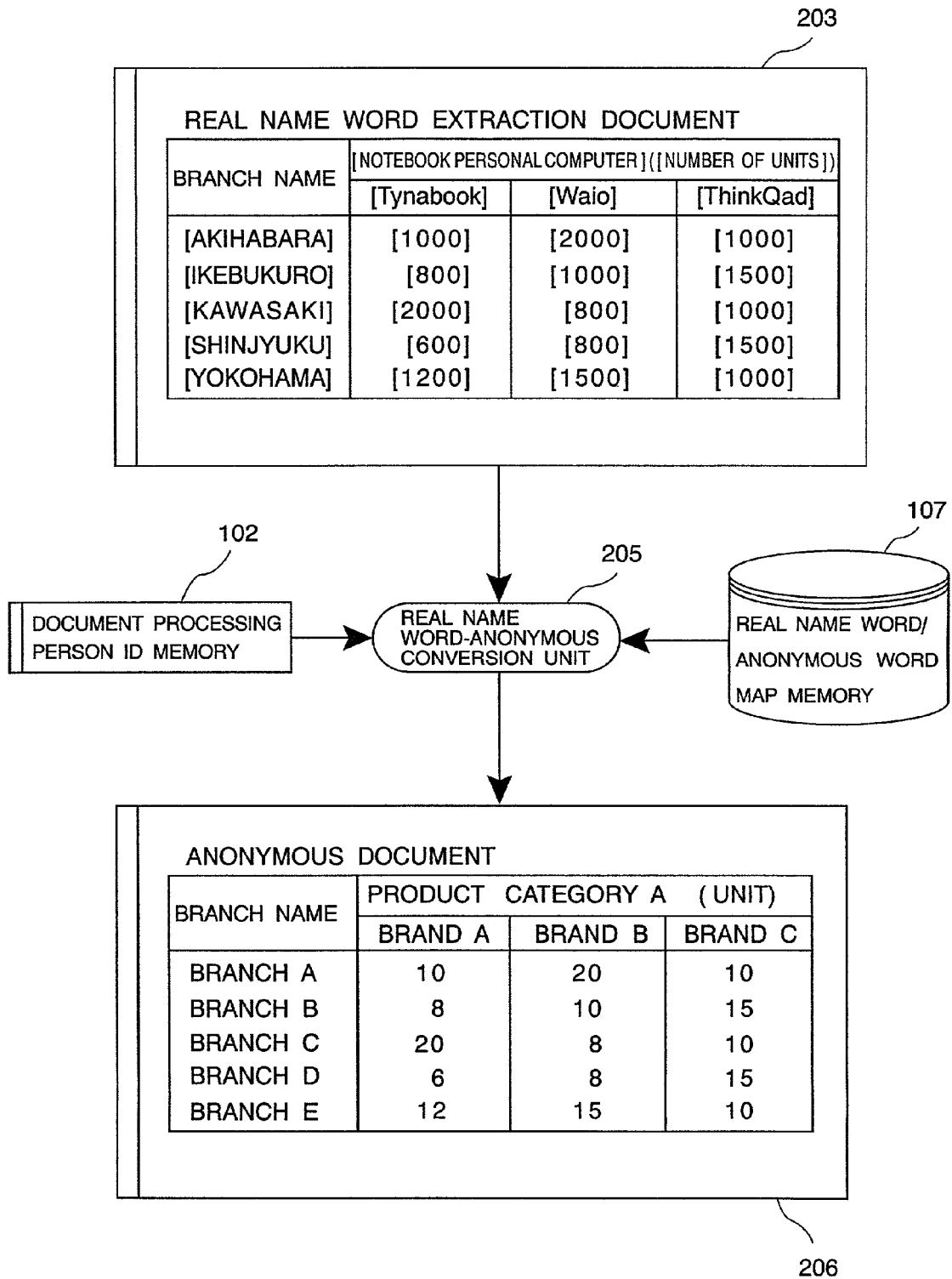
FIG. 9 is a schematic diagram of conversion from the real name word to the anonymous word according to an embodiment of the present invention.

In the case of converting an ordinary real name word to the anonymous word, the anonymous word is created by adding the additional label to the anonymous term corresponding to the ordinary real name word. In the case of converting a real name word, such as a numerical value with a predetermined unit (For example, weight, length, . . . ), to the anonymous word, a magnification as the anonymous term corresponding to the real name word is multiplied to the numerical value, and the additional label corresponding to the real name word is added to the multiplication result as the anonymous word. FIG. 9 shows an example of document of which real name word is converted to the anonymous word in an embodiment of the present invention. In FIG. 9, each real name word in the real name word extraction document of table format data shown in FIG. 8 is converted to the anonymous word. The anonymous document shown in FIG. 9 represents sales data (the number of units) of product category A in April for each branch. Assume that the similar data in January, February, March, exist (not shown in FIG. 9), and that a user requests a document processing person (analyst) to analyze these sales data from January to April as the anonymous document. The user receives a analysis result (a newly created anonymous document related with the anonymous document) from the document processing person. Hereinafter, a method for unanonymizing the analysis result is explained.

Figure 10:
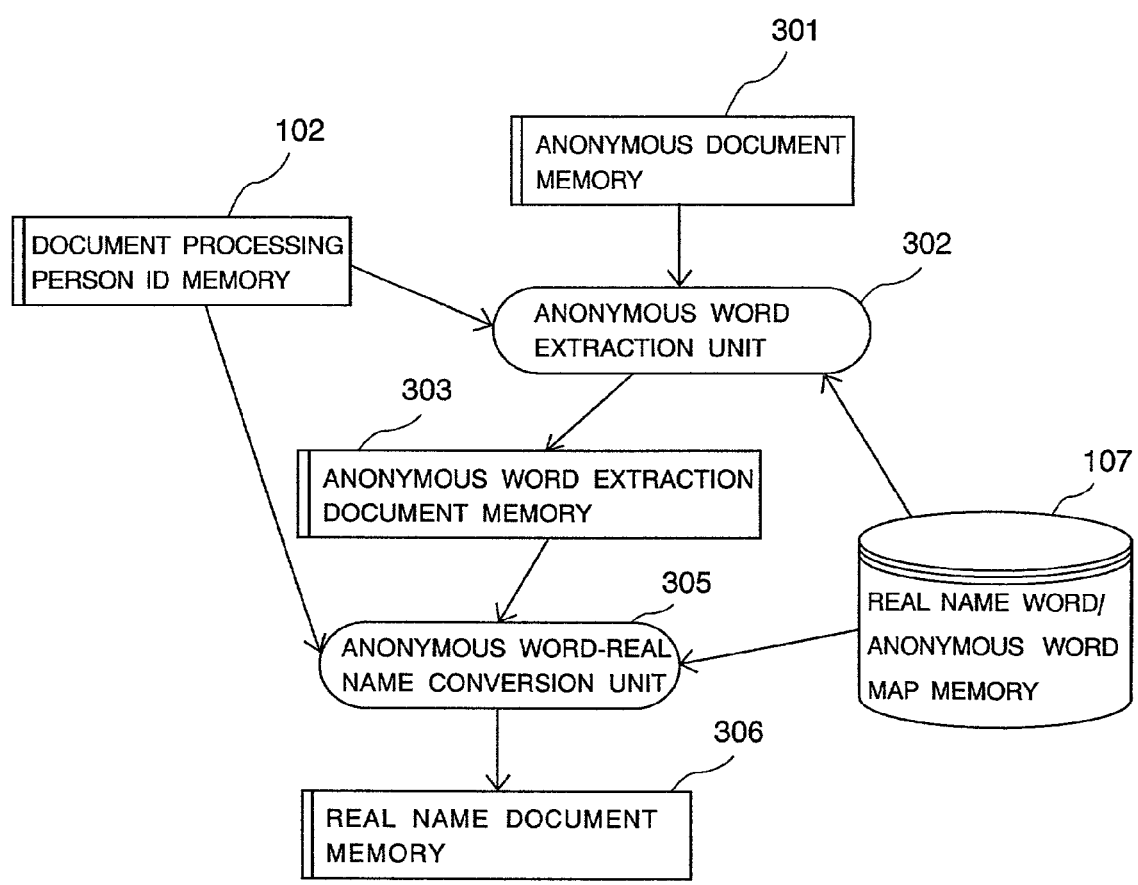
FIG. 10 is a block diagram of an apparatus for unanonimizing an electronic document according to a third embodiment of the present invention.
Figure 11:
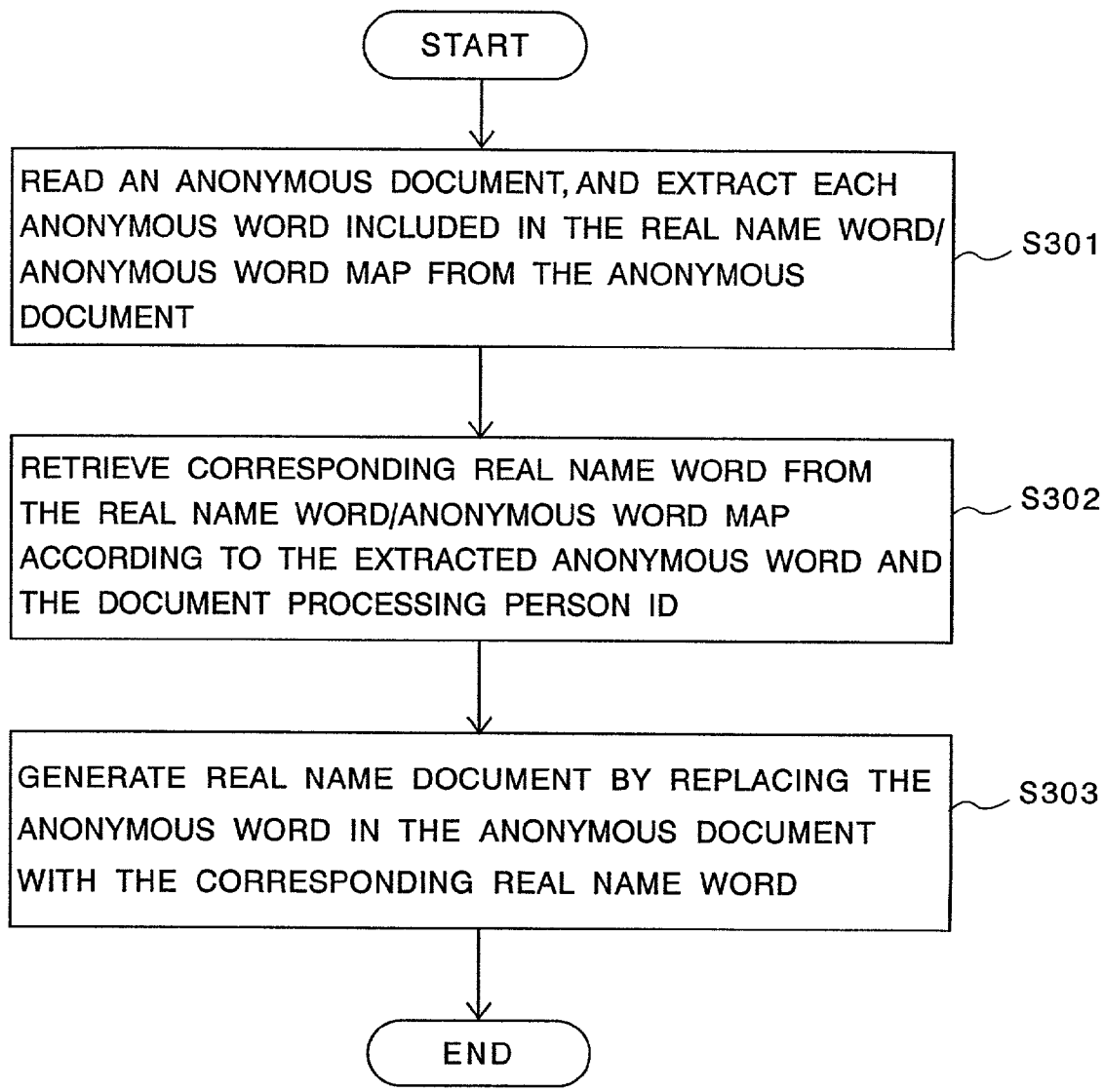
FIG. 11 is a flow chart of a method for unanonimizing the electronic document according to the third embodiment of the present invention.

FIG. 10 is block diagram of the apparatus for unanonymizing an electronic document according to the third embodiment of the present invention. FIG. 11 is a flow chart of processing of a method for unanonymizing the electronic document according to an embodiment of the present invention. As shown in FIG. 10, this apparatus is typically implemented in a computer and includes an anonymous document memory 301, an anonymous word extraction unit 302, an anonymous word extraction document memory 303, the document processing person ID memory 102, an anonymous word-real name conversion unit 305, the real name word/anonymous word map memory 107, and a real name document memory 306. In case of converting the analysis document (anonymous document sent from the document processing person) to a real name document, the user first stores the anonymous document in the anonymous document memory 301 by using an electronic file. Furthermore, the user stores a document processing person ID of the document processing person in the document processing person ID memory 102 by using a keyboard.

In the anonymous document memory 301, the anonymous document of which contents are to be unanonymized is stored. In the document processing person ID memory 102, the document processing person ID of the document processing person who created the anonymous document (analysis result) is stored.

Figure 12:
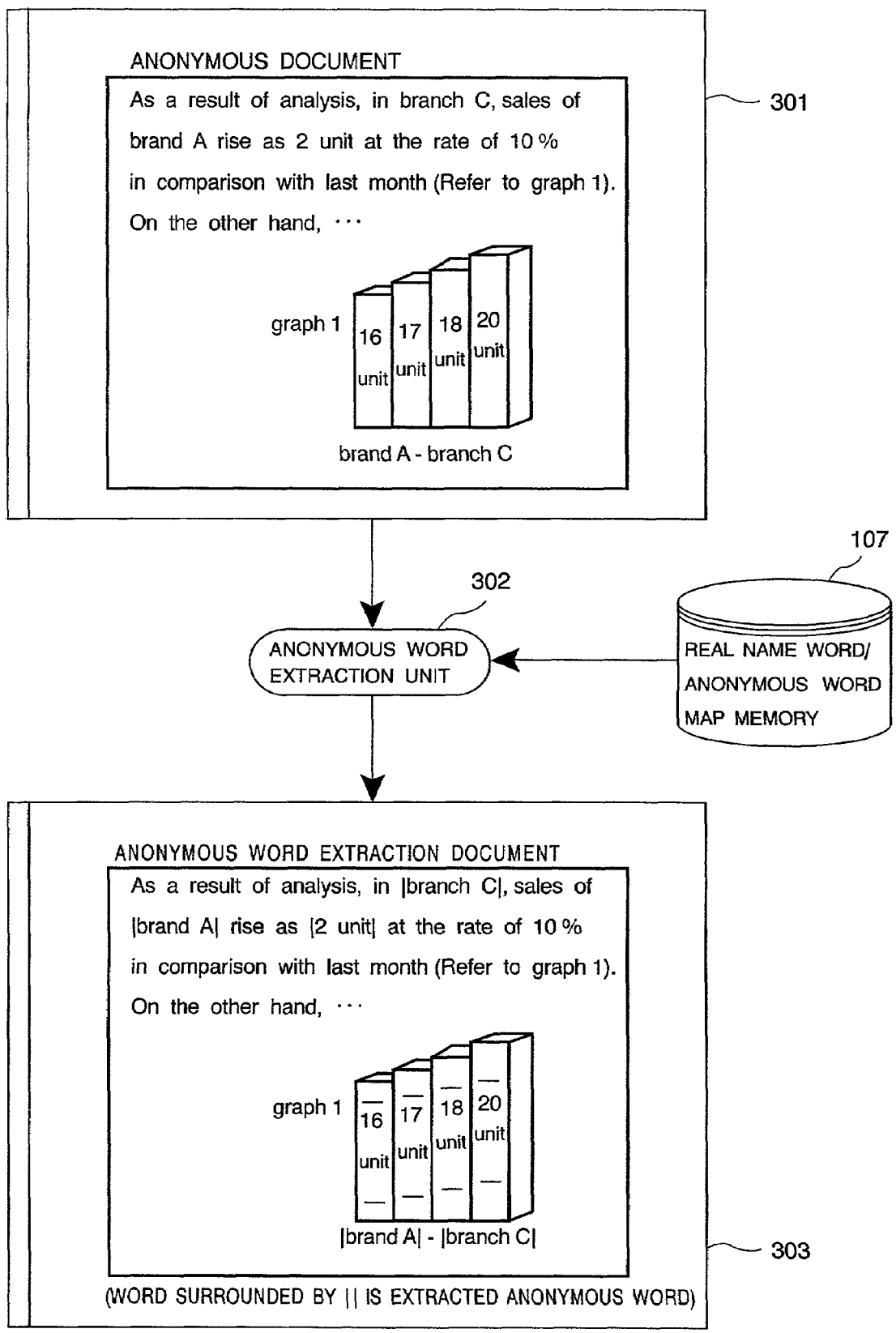
FIG. 12 is a schematic diagram of extraction of the anonymous word from the electronic document according to an embodiment of the present invention.

In the anonymous word extraction unit 302, an anonymous document to be unanonymized is read from the anonymous document memory 301, and a real name word/anonymous word map corresponding to the document processing person ID is read from the real name word/anonymous word map memory 107. Then, each anonymous word registered in the real name word/anonymous word map is extracted from the anonymous document. The anonymous document is created as an anonymous word extraction document and stored in the anonymous word extraction document memory 303 (S301). FIG. 12 shows an example of conversion from the anonymous document to the anonymous word extraction document. As shown in the anonymous word extraction document, each anonymous word included in the anonymous document created by the document processing person is extracted. In FIG. 12, each anonymous word is surrounded by "| |".

In the anonymous word-real name conversion unit 305, the anonymous word extraction document is read from the anonymous word extraction document memory 303, and the document processing person ID of the document processing person who created the anonymous document is read from the document processing person ID memory 102. Then, the real name word/anonymous word map corresponding to the document processing person ID is selected from the real name word/anonymous word map memory 107. The real name word corresponding to each anonymous word included in the anonymous word extraction document is decided by referring to the real name word/anonymous word map (S302). Furthermore, each real name word in the anonymous word extraction document is replaced by a corresponding anonymous word or the corresponding anonymous word is added to each real name word in the anonymous word extraction document. In this way, a real name document is created and stored in the real name document memory 306 (S303).

Figure 13:
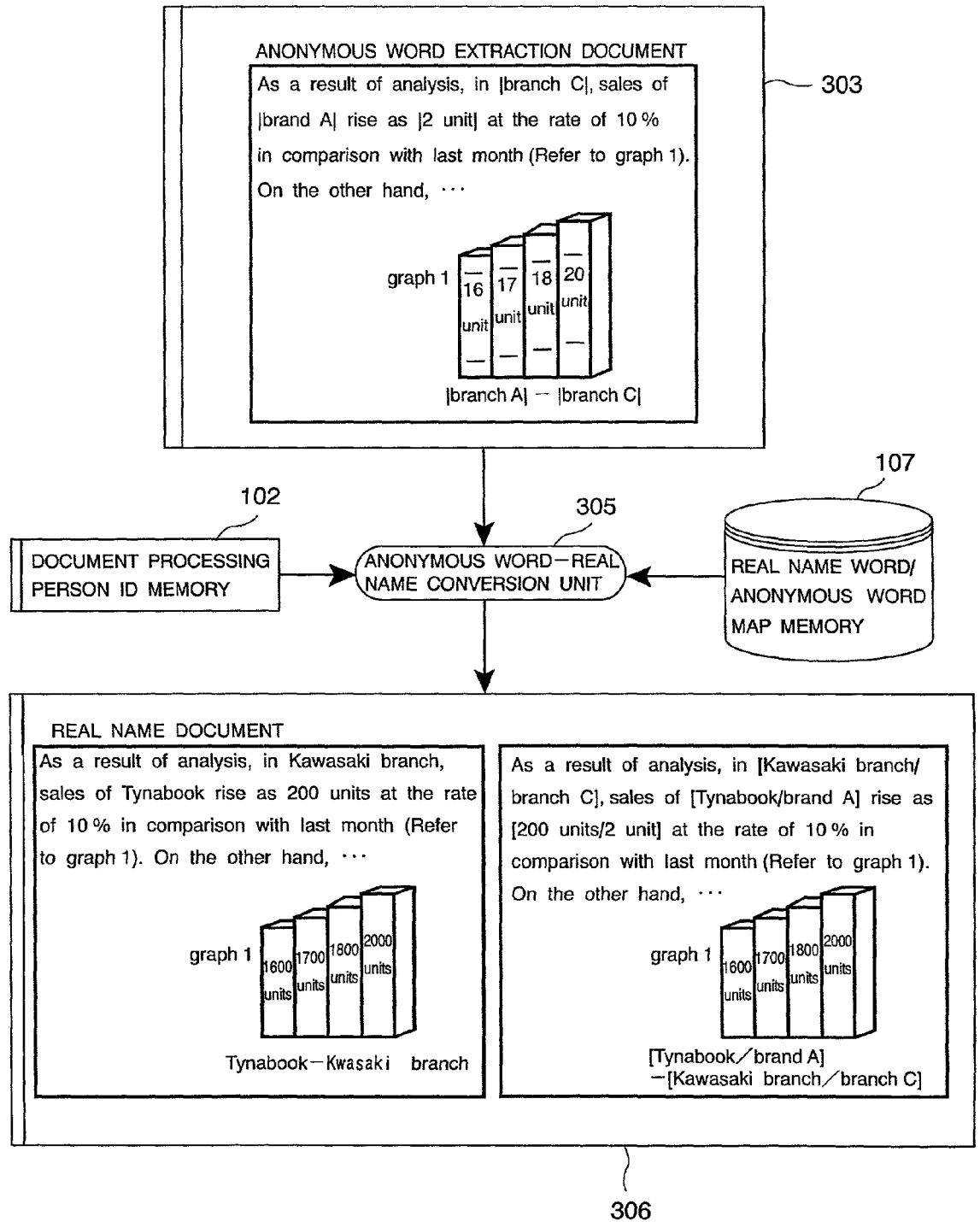
FIG. 13 is a schematic diagram of conversion from the anonymous word to the real name word according to an embodiment of the present invention.

In the case of converting an ordinary anonymous word to a real name word, the real name word is created by selecting the real name word corresponding to the ordinary anonymous word. In the case of converting an anonymous word such as a numerical value with a predetermined term (additional label) such as "UNIT" to a real name word, the numerical value is divided by a normalization value (magnification) as the anonymous term corresponding to the anonymous word registered in the real name word/anonymous word map. The predetermined term is then replaced by a predetermined unit (for example, weight, length, and so on) of the real name word corresponding to the anonymous word registered in the real name word/anonymous word map. The predetermined unit is combined with the division result. In this way, the real name word is created (restored). FIG. 13 shows an example of conversion from the anonymous word extraction document to the real name document in accordance with an embodiment of the invention. In FIG. 13, one real name document (left side document) includes each real name word converted from the anonymous word in the anonymous word extraction document, and the other real name document (right side document) includes both each real name and corresponding anonymous word.

As mentioned-above, in embodiments of the present invention, the real name word (predetermined noun/actual numerical) which the user does not wish to become known by the document processing person in the electronic document is anonymized as a daily use representation. Accordingly, the anonymized or anonymous document can be provided to the document processing person without preventing the document processing person from understanding.

Furthermore, the relationship between each real name word and corresponding anonymous word is preserved as the real name word/anonymous word map on the user side. In the real name word/anonymous word map, the additional label to maintain one-to-one relationship between the real name word and the anonymous word is typically included. Accordingly, when the user receives the analysis report (new anonymous document) related to the anonymous document from the document processing person, the user can read the real name document converted from the analysis report.

Furthermore, in the case of converting the analysis report to the real name document, by adding the real name word to the anonymous word in the analysis report, the user can more easily understand contents of the analysis report by the real name word. In addition to this, when the user talks to the document processing person about the analysis report by telephone or in person, the user can smoothly communicate with the document processing person not by using important information but by using the anonymous word. Briefly, business such as the reordering of analysis can be executed for the user while leakage of important information is prevented.

The processing of the above-mentioned various embodiments can be accomplished by a computer-executable program, and this program can be realized in a computer-readable memory device.

In embodiments of the present invention, the memory device, such as a magnetic disk, floppy disk, hard disk optical disk (CD-ROM, CD-R, DVD, and so on), optical magnetic disk (MD, and so on) can be used to store instructions for causing a processor or computer to perform the processes described above.

Furthermore, based on an indication of the program installed from the memory device to the computer, an OS(operation system) operating on the computer, or MW(middle wear), such as database management software or network, may execute one part of each processing to realize the embodiments.

Furthermore, the memory device is not limited to a device independent from the computer. By downloading a program transmitted through a network, such as a LAN or the Internet, a memory device in which the program is stored is included. Furthermore, the memory device is not limited to one. In the case that the processing of the embodiments is executed by a plurality of memory devices, the plurality of memory devices may be included in the memory device. The components of the device may be arbitrarily composed.

In the described embodiments of the present invention, the computer executes each processing of the embodiments according to the program stored in the memory device. The computer may be one apparatus, such as a personal computer or a system in which a plurality of apparatuses are connected through the network. Furthermore, in embodiments of the present invention, the computer is not limited to the personal computer. The computer may be a processing unit in an information processor, a micro computer, and so on. In short, the computer is generally any processing structure and memory that can execute the functions described above in embodiments of the present invention.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. An apparatus for creating a map of a real name word to an anonymous word for an electronic document to be provided to a document processing person, the anonymous word being a more general and less specific meaning of the real name word, the apparatus comprising:
   a processor;
   an anonymous level decision unit configured to decide an anonymous level as an abstract degree to anonymize the real name word included in the electronic document, wherein the anonymous level decision unit sets the anonymous level for the real name word to a low level when a usage frequency of the real name word is high in the electronic document;
   a dictionary configured to store a correspondence relationship between the real name word and at least one anonymous term as an abstract concept of the real name word, wherein each anonymous term corresponds to the anonymous level;
   an additional label generation unit configured to generate an additional label uniquely corresponding to the real name word if said dictionary stores the same anonymous term corresponding to a plurality of real name words included in the electronic document; and
   a map creation unit configured to select the at least one anonymous term corresponding to the real name word and the decided anonymous level from said dictionary, to generate an anonymous word corresponding to the real name word by adding the additional label to the anonymous term, and to correspondingly store the real name word and the anonymous word, whereby a map representing a correspondence relationship between the real name word and the anonymous word is stored in correspondence with an identifier of the document processing person.

2. The apparatus according to claim 1, wherein said dictionary stores a plurality of anonymous terms corresponding to the real name word, each of the plurality of anonymous terms corresponds to different anonymous levels.

3. The apparatus according to claim 2, wherein said dictionary stores the anonymous term of a higher abstract degree corresponding to a larger of the anonymous level.

4. The apparatus according to claim 3, wherein said dictionary stores a larger number of anonymous terms that respectively correspond to different anonymous level for the real name word of a narrower category.

5. The apparatus according to claim 2, wherein said dictionary stores a normalization numerical value corresponding to the real name word including numerical value data.

6. The apparatus according to claim 3, wherein said anonymous level decision unit decides the anonymous level of the real name word by referring to said dictionary in accordance with a user's indication.

7. The apparatus according to claim 1, wherein said additional label generation unit generates the additional label corresponding to the real name word by using a random number to uniquely identify the real name word.

8. The apparatus according to claim 5, wherein said map creation unit multiplies the normalization numerical value with the numerical value data included in the real name word, and adds the additional label corresponding to the real name word to the multiplied value as the anonymous word.

9. The apparatus according to claim 1, wherein said map creation unit differently creates the map in correspondence with each identifier of a plurality of document processing persons.

10. The apparatus according to claim 1, wherein the map correspondingly stores the real name word, the anonymous word, the anonymous term and the additional label from which the anonymous word is generated.

11. A method for creating a map of a real name word to an anonymous word for an electronic document to be provided to a document processing person, the anonymous word being a more general and less specific meaning of the real name word, the method comprising:
   deciding an anonymous level as an abstract degree to anonymize the real name word included in the electronic document, wherein the anonymous level for the real name word is set to a low level when a usage frequency of the real name word is high in the electronic document;
   storing a correspondence relationship between the real name word and at least one anonymous term as an abstract concept of the real name word in a dictionary, wherein each anonymous term corresponds to the anonymous level;
   generating an additional label uniquely corresponding to the real name word if the dictionary stores the same anonymous term corresponding to a plurality of real name words included in the electronic document;
   selecting the at least one anonymous term corresponding to the real name word and the decided anonymous level from the dictionary;
   generating an anonymous word corresponding to the real name word by adding the additional label to the anonymous term; and
   correspondingly storing the real name word and the anonymous word, whereby a map representing a correspondence relationship between the real name word and the anonymous word is stored in correspondence with an identifier of the document processing person.

12. A computer program product embodied in a computer-readable medium, comprising:
   a computer readable program code embodied in said product for causing a computer to create a map of a real name word to an anonymous word for an electronic document to be provided to a document processing person, the anonymous word being a more general and less specific meaning of the real name word, said computer readable program code having:
   a first program code to decide an anonymous level as an abstract degree to anonymize the real name word included in the electronic document, wherein the first program code sets the anonymous level for the real name word to a low level when a usage frequency of the real name word is high in the electronic document;
   a second program code to store a correspondence relationship between the real name word and at least one anonymous term as an abstract concept of the real name word in a dictionary, wherein each anonymous term corresponds to the anonymous level;
   a third program code to generate an additional label uniquely corresponding to the real name word if the dictionary stores the same anonymous term corresponding to a plurality of real name words included in the electronic document;
   a fourth program code to select the anonymous term corresponding to the real name word and the decided anonymous level from the dictionary;

a fifth program code to generate an anonymous word corresponding to the real name word by adding the additional label to the anonymous term; and a sixth program code to correspondingly store the real name word and the anonymous word, whereby a map representing a correspondence relationship between the real name word and the anonymous word is stored in correspondence with an identifier of the document processing person.

13. An apparatus for anonymizing an electronic document to be provided to a document processing person, anonymization being a conversion from a real name word to a more general and less specific meaning of the real name word, the apparatus comprising:

a processor;

an anonymous level decision unit configured to decide an anonymous level as an abstract degree to anonymize a real name word included in the electronic document, wherein the anonymous level decision unit sets the anonymous level for the real name word to a low level when a usage frequency of the real name word is high in the electronic document;

a dictionary configured to store a correspondence relationship between the real name word and at least one anonymous term as an abstract concept of the real name word, wherein each anonymous term corresponds to the anonymous level;

an additional label generation unit configured to generate an additional label uniquely corresponding to the real name word if said dictionary stores the same anonymous term corresponding to a plurality of real name words included in the electronic document;

a map creation unit configured to select the anonymous term corresponding to the real name word and the decided anonymous level from said dictionary, to generate an anonymous word corresponding to the real name word by adding the additional label to the anonymous term, and to correspondingly store the real name word and the anonymous word, whereby a map representing a corresponding relationship between the real name word and an anonymous word is stored in correspondence with an identifier of the document processing person;

a real name word extraction unit configured to extract the real name word from the electronic document by referring to the map; and a conversion unit configured to replace the extracted real name word with the corresponding anonymous word by referring to the map.

14. A method for anonymizing an electronic document to be provided to a document processing person, anonymization being a conversion from a real name word to a more general and less specific meaning of the real name word, the method comprising:

deciding an anonymous level as an abstract degree to anonymize a real name word included in the electronic document, wherein the anonymous level for the real name word is set to a low level when a usage frequency of the real name word is high in the electronic document;

storing a correspondence relationship between the real name word and at least one anonymous term as an abstract concept of the real name word in a dictionary, wherein each anonymous term corresponds to the anonymous level;

generating an additional label uniquely corresponding to the real name word if the dictionary stores the same anonymous term corresponding to a plurality of real name words included in the electronic document;

selecting an anonymous term corresponding to the real name word and the decided anonymous level from the dictionary;

generating an anonymous word corresponding to the real name word by adding the additional label to the anonymous term;

correspondingly storing the real name word and the anonymous word, whereby a map representing a correspondence relationship between the real name word and the anonymous word is stored in correspondence with an identifier of the document processing person;

extracting the real name word from the electronic document by referring to the map; and replacing the extracted real name word with the corresponding anonymous word by referring to the map.

15. A computer program product embodied in a computer-readable medium, comprising:

a computer readable program code embodied in said product for causing a computer to anonymize an electronic document to be provided to a document processing person, anonymization being a conversion from a real name word to a more general and less specific meaning of the real name word, said computer readable program code having:

a first program code to decide an anonymous level as an abstract degree to anonymize a real name word included in the electronic document, wherein the first program code sets the anonymous level for the real name word to a low level when a usage frequency of the real name word is high in the electronic document;

a second program code to store a correspondence relationship between the real name word and at least one anonymous term as an abstract concept of the real name word in a dictionary, wherein each anonymous term corresponds to the anonymous level;

a third program code to generate an additional label uniquely corresponding to the real name word if the dictionary stores the same anonymous term corresponding to a plurality of real name words included in the electronic document;

a fourth program code to select the anonymous term corresponding to the real name word and the decided anonymous level from the dictionary;

a fifth program code to generate an anonymous word corresponding to the real name word by adding the additional label to the anonymous term;

a sixth program code to correspondingly store the real name word and the anonymous word, whereby a map representing a correspondence relationship between the real name word and the anonymous word is stored in correspondence with an identifier of the document processing person;

a seventh program code to extract the real name word from the electronic document by referring to the map; and an eighth program code to replace the extracted real name word with the corresponding anonymous word by referring to the map.

16. An apparatus for unanonymizing an electronic document, unanonymization being a conversion from a more general and less specific meaning of a real name word to the real name word, the apparatus comprising:

a processor;

an anonymous level decision unit configured to decide an anonymous level as an abstract degree to anonymize a real name word included in the electronic document to be provided to a document processing person, wherein the anonymous level decision unit sets the anonymous level for the real name word to a low level when a usage frequency of the real name word is high in the electronic document;

a dictionary configured to store a correspondence relationship between the real name word and at least one anonymous term as an abstract concept of the real name word, wherein each anonymous term corresponds to the anonymous level;

an additional label generation unit configured to generate an additional label uniquely corresponding to the real name word if said dictionary stores the same anonymous term corresponding to a plurality of real name words in the electronic document;

a map creation unit configured to select the anonymous term corresponding to the real name word and the decided anonymous level from said dictionary, to generate an anonymous word corresponding to the real name word by adding the additional label to the anonymous term, and to correspondingly store the real name word and the anonymous word, whereby a map representing a correspondence relationship between the real name word and the anonymous word is stored in correspondence with an identifier of the document processing person;

an anonymous word extraction unit configured to extract each anonymous word from an anonymous document related to an anonymous version of the electronic document by referring to the map, the anonymous document being returned from the document processing person; and a conversion unit configured to add the corresponding real name word to the extracted anonymous word in the anonymous document by referring to the map.

17. The apparatus according to claim 16, wherein said conversion unit replaces the extracted anonymous word with the corresponding real name word in the anonymous document.

18. A method for unanonymizing an electronic document, unanonymization being a conversion from a more general and less specific meaning of a real name word to the real name word, the method comprising:

deciding an anonymous level as an abstract degree to anonymize a real name word included in an electronic document to be provided to a document processing person, wherein the anonymous level for the real name word is set to a low level when a usage frequency of the real name word is high in the electronic document;

storing a correspondence relationship between the real name word and at least one anonymous term as an abstract concept of the real name word in a dictionary, wherein each anonymous term corresponds to the anonymous level;

generating an additional label uniquely corresponding to the real name word if the dictionary stores the same anonymous term corresponding to a plurality of real name words included in the electronic document;

selecting the anonymous term corresponding to the real name word and the decided anonymous level from the dictionary;

generating an anonymous word corresponding to the real name word by adding the additional label to the anonymous term;

correspondingly storing the real name word and the anonymous word, whereby a map representing a correspondence relationship between the real name word and the anonymous word is stored in correspondence with an identifier of the document processing person;

extracting each anonymous word from an anonymous document related to an anonymous version of the electronic document by referring to the map, the anonymous document being returned from the document processing person; and adding the corresponding real name word to the extracted anonymous word in the anonymous document by referring to the map.

19. A computer program product embodied in a computer-readable medium, comprising:

a computer readable program code embodied in said product for causing a computer to unanonymize an electronic document, unanonymization being a conversion from a more general and less specific meaning of a real name word to the real name word, said computer readable program code having:

a first program code to decide an anonymous level as an abstract degree to anonymize a real name word included in the electronic document to be provided to a document processing person, wherein the first program code sets the anonymous level for the real name word to a low level when a usage frequency of the real name word is high in the electronic document;

a second program code to store a correspondence relationship between the real name word and at least one anonymous term as an abstract concept of the real name word in a dictionary, wherein each anonymous term corresponds to the anonymous level;

a third program code to generate an additional label uniquely corresponding to the real name word if the dictionary stores the same anonymous term corresponding to a plurality of real name words included in the electronic document;

a fourth program code to select the anonymous term corresponding to the real name word and the decided anonymous level from the dictionary;

a fifth program code to generate an anonymous word corresponding to the real name word by adding the additional label to the anonymous term;

a sixth program code to correspondingly store the real name word and the anonymous word, whereby a map representing a correspondence relationship between the real name word and the anonymous word is stored in correspondence with an identifier of the document processing person;

a seventh program code to extract each anonymous word from an anonymous document related to an anonymous version of the electronic document by referring to the map, the anonymous document being returned from the document processing person; and an eighth program code to add the corresponding real name word to the extracted anonymous word in the anonymous document by referring to the map.

* * * * *